Figure 1:
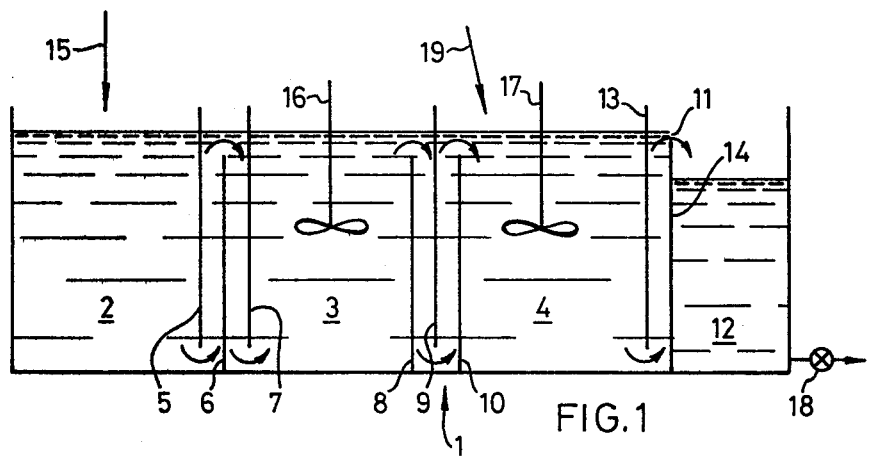

United States Patent [19]

Smith

[11] 4,295,933
[45] Oct. 20, 1981

[54] PRODUCING DISPERSIONS OF PREFLOCCULATED FILLERS FOR USE IN PAPERMAKING

[75] Inventor: David E. Smith, Longfield, England

[73] Assignee: Blue Circle Industries Limited, London, England

[21] Appl. No.: 137,476

[22] Filed: Apr. 3, 1980

Related U.S. Application Data

[63] Continuation of Ser. No. 923,347, Jul. 10, 1978, abandoned.

[30] Foreign Application Priority Data

Jul. 12, 1977 [GB] United Kingdom ............ 29209/77

[51] Int. Cl.³ ............................................. D21H 3/82
[52] U.S. Cl. ............................ 162/168 NA; 162/175; 162/183; 162/181 A; 162/181 B; 162/181 D; 162/181 C
[58] Field of Search ............... 162/168 NA, 183, 175, 162/181 R, 181 A, 181 B, 181 C, 181 D; 260/29.6 PM

[56] References Cited

U.S. PATENT DOCUMENTS

| | | | |
|---|---|---|---|
| 3,282,874 | 11/1966 | Friedrich et al. | 260/29.6 PM |
| 3,873,336 | 3/1975 | Lambert et al. | 162/175 |
| 3,927,971 | 8/1976 | Quinn et al. | |
| 4,094,736 | 6/1978 | Malden | 162/175 |

FOREIGN PATENT DOCUMENTS

| | | | |
|---|---|---|---|
| 2551259 | 5/1976 | Fed. Rep. of Germany | 162/175 |
| 447810 | 5/1936 | United Kingdom | 162/175 |

OTHER PUBLICATIONS

"Univeral Polyprep Unit", Brochure ML 60086, Wallace & Tiernan Ltd., Kent, England, 2/76.

Primary Examiner—William F. Smith
Attorney, Agent, or Firm—Diller, Ramik & Wight

[57] ABSTRACT

Producing polymer dispersions for use in papermaking with a relatively high content of a solubilized polymeric material which serves in the presence of paper filler as binder and dissolves only with difficulty, by continuously passing an aqueous suspension of the particulate binder through a treatment zone (2,3,4) in at least part of which it is subjected to shear, the rate of flow and degree of shear being such that the residence time in the zone allows optimum swelling of the binder and the resulting solution of polymeric binder is visually homogeneous. Flocculant and filler are preferably also incorporated to provide a continuous supply of preflocculated filler for a papermaking furnish. Typical materials are cold water soluble starch as binder, polyacrylamide as flocculant and chalk whiting as filler.

25 Claims, 2 Drawing Figures

PRODUCING DISPERSIONS OF PREFLOCCULATED FILLERS FOR USE IN PAPERMAKING

This is a continuation, of application Ser. No. 923,347 filed July 10, 1978 abandoned.

The present invention relates to polymeric materials, for use generally with fillers in the manufacture of paper such as clay, lithopone, barium sulphate, titanium pigments, talc, satin white, and calcium carbonate, for instance chalk whiting.

Such mineral fillers are included in the furnish for the manufacture of various types of paper. As the proportion of filler to cellulose increases, the opacity of the eventual paper increases but the strength properties tend to decrease and moreover the fillers tend to be lost into the water drained from the wet formed paper web, so that it is usual to add so-called retention aids. These are normally polymers of high molecular weight which tend to flocculate together the filler particles and the fine cellulose fibres. Fillers can also be treated as such in suspension with polymers having a flocculant effect before the filler is introduced into the paper furnish, to produce so-called pre-flocculated fillers.

The present invention is particularly concerned with solubilisation on a continuous basis, of polymeric material, which serves, in the presence of such filler, as binder and possibly also as flocculant. The invention is especially concerned with the continuous solubilisation of polymeric material containing starch compounds, generally of pre-gelatinised type, referred to as coldwater soluble starches, and with the continuous preparation of pre-flocculated fillers prepared with such solubilised material for use in papermaking.

The invention is also concerned with polymer dispersions and pre-flocculated filler dispersions produced by the method. The invention may be applied to polymeric materials in which the binder and flocculant functions are contributed by the same polymeric binder or by a polymeric binder and another component or components which may be polymeric, in the presence or absence of at least one filler or pigment for paper.

It is observed that polymeric substances which are useful agents in this respect with regard to effectiveness or low cost, tend to be slow or difficult to bring into a suitable state of aqueous dispersion especially if heating is to be avoided. This is particularly the case with polymers of high molecular weight and with starch-based polymers (i.e. polymeric material containing a starch compound) and the latter will be referred to in this description as an example of polymeric binders to which this invention is directed with particular advantage.

An aqueous dispersion containing polymeric materials, suitable for the purpose envisaged, is one in which the materials are solubilised, that is to say, dispersed on a substantially molecular basis rather than on a merely particulate basis. In this connection the term "solution" is intended to include not only true molecular solution but also dispersions of polymer wherein the polymer is so highly solubilised as to cause the dispersion to be visually homogeneous, if not visually clear, with substantially no matter visible as individual particles or globules. In the preparation of such a solution, three features are essential: there must be thorough dispersion of the initial particles as such in the water, i.e., on a particulate scale; there must be swelling of or absorption of water by the particles; and there must be application of a controlled degree of shear, for example by mixing, such that the dimensions of the finally dispersed entities are of a molecular order, but have not undergone excessive molecular scission.

The problem of obtaining satisfactory solubilised dispersion of the polymeric material, particularly with starch based polymers, is aggravated in the present context by the general desire or requirement to deal with solids contents of 0.5 percent by weight or more, which are relatively high in this context.

Normally a batch solubilisation system has been used hitherto whereby the polymeric material is added to water in a suitably agitated vessel where dispersion occurs followed by swelling and solubilisation under applied shear for say 10 to 30 minutes. The solubilised material is then either transferred to a storage vessel from where it is metered and continuously mixed with a metered supply of the filler or fillers, or transferred to a second agitated vessel and mixed batchwise with a suspension of filler or fillers, and thence metered to the papermaking process. The batch system can be operated in a sequence manually or automatically so as to provide a continuous supply. However, to service a large papermaking machine the batch process requires vessels of large volume and on storage the prepared material can degrade by bacteriological action, and filler particles, especially clay, can absorb a proportion of polymeric material thus reducing their binding action and flocculant properties; there is also the danger of over-shear by excessive mixing.

Clearly it is desirable to provide a supply conveniently to hand, of polymeric material of the type referred to, solubilised on a continuous basis. It is further desirable that the solubilisation process should be as simple and as controlled as possible, so that the supplied dispersion shall be uniform and amenable to accurate, preferably automatic, dosing or metering to the papermaking process.

In the method of the invention the vessel capacities can be reduced compared with those of the batch system and the process is made continuous, by arranging flow e.g. by syphon, overflow or dosing between the described vessels or other vessels, which may be arranged for instance in a line or in a cascade.

It is known to produce a dispersion of a solubilised polyelectrolyte, as used for instance in flocculating aqueous sewage liquors for clarification purposes, for example by a continuous process using a series of vessels whereby the particulate polyelectrolyte is entrained in a stream of water and collected as an initial dispersion in the first vessel which overflows via an overflow pipe into the second. In passing through the second vessel and overflowing via an overflow pipe into the third, and again in passing through the third vessel and overflowing into a stock chamber, the dispersion is allowed to age according to the vessel capacities and the flow rate. The flow rate of the solid and liquid feeds is pre-set. The onset and cessation of flow is controlled dependent upon the maintenance of predetermined volume between pre-set levels in a stock chamber, from which the matured dispersion is continuously withdrawn, e.g., by a dosing pump, for use. While the dispersion is in the vessels it is kept in gentle motion but avoiding shear, by slow-speed stirrers. Without modification this process is not generally satisfactory for solubilising polymeric binders.

According to the invention we provide a method of producing a supply for use with filler in papermaking of an aqueous dispersion containing a solubilised polymeric binder, characterised by the steps of: continuously forming a suspension of the polymeric binder in particulate form in an aqueous medium, the concentration of the binder solids in the suspension being at least 0.5 percent by weight; passing the formed suspension continuously through a treatment zone wherein the suspended particulate polymeric binder is allowed to swell in the aqueous medium and is subjected to shear; and regulating the rate of flow of the resulting dispersion through the treatment zone, and the degree of shear applied, so that the residence time of the dispersed polymeric binder in the treatment zone is at least sufficient for optimum swelling of said polymeric binder in the water and the resulting solution of polymeric binder in the aqueous medium is visually homogeneous.

In practice the rate of flow is to be matched with the papermaking process being supplied and the vessel or vessels constituting the treatment zone will accordingly be made of sufficient capacity to accommodate the dispersion for the required residence time at the given flow rate.

According to a further aspect of the invention a continuous supply of a preflocculated filler dispersion is obtained by incorporating a filler in the aqueous medium employed in the solubilisation method, at any stage thereof. The need for a separate in-line mixer or other separate stage for contacting filler and polymeric material is thus eliminated. The filler, dry or in slurry form, may for instance be introduced into the initial suspension along with or after the polymeric binder, or added in the abovementioned treatment zone or in an extension of it, or it may be used in addition to, or (as slurry) in place of, water in the initial suspension formation.

The invention further provides a method of making paper wherein the papermaking furnish is continuously supplied with the preflocculated filler product produced by the method of the invention.

In general the suspension of preflocculated filler is introduced into the papermaking system at a point usual for such prepared fillers. Normally the preflocculated filler slurry is used in papermaking (or similar processes) after the addition of the sizing chemicals, e.g. at the fan pump, into which it would be continuously metered. Organic polymeric retention aids may also be included or added separately before the formation of the paper web.

The concentration of polymeric binder solids in the aqueous suspension is at least 0.5 percent by weight, preferably at least 2.0 percent.

The concentration of the filler in the suspension of preflocculated filler is typically but by no means necessarily 40 to 50 percent by weight based on the suspension but can be raised to the region of 80 percent with the aid of viscosity modifiers.

As already indicated, the polymeric material to be solubilised may comprise one or more components which alone or together act as binder and flocculant in a suspension of filler and paper fibres. Typical polymeric binders include starch-based polymers, water soluble vinyl polymers such as polyvinyl alcohol, and gums such as xanthan gum. A preferred polymeric material is one comprising a cold water soluble starch based polymer, which may be treated alone particularly if cationic, or in association with other components such as alginates or flocculants such as polyacrylamides. Further polyelectrolytes may be present in the dispersion being solubilised. Polymeric material may also be added to the dispersion in the treatment zone. The proportion of added flocculant may for example be from one to ten percent based on the binder, a typical proportion being 5 percent based on the binder, or 0.2 percent based on filler, the amount of flocculant and binder together being typically 4 to 5 percent based on the filler.

In an embodiment of the invention the treatment zone comprises several vessels, or a compartmented vessel, providing a series of for example three chambers through which the dispersion undergoing solubilisation flows continuously in sequence. Thus a first chamber may be arranged to receive the suspension as it forms; swelling of the polymeric material commences in the first chamber, continues in the second chamber and is completed in the third chamber. Shear will be applied at least in the third chamber, preferably also in the second chamber, and, if necessary, in the first chamber, to complete the solubilisation of the polymeric material before it is passed to a reservoir.

Figure 2:
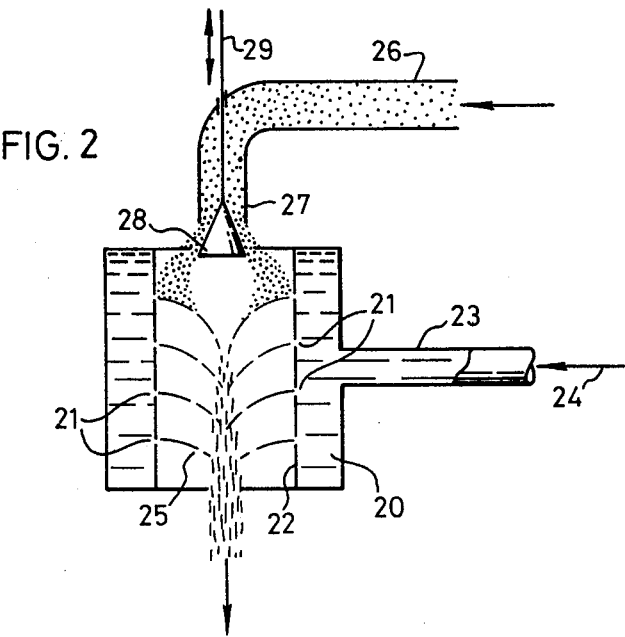

In the accompanying drawings,

FIG. 1 illustrates in diagrammatic vertical longitudinal cross-section an example of tank apparatus suitable for carrying out the method of the invention and FIG. 2 shows in diagrammatic vertical cross-section a form of disperser for supplying to apparatus such as that of FIG. 1 an initial dispersion of polymer particles in water.

Referring to FIG. 1, the apparatus comprises a tank 1, divided by two sets of baffles into three compartments 2, 3 and 4. A first set of baffles 5, 6, 7, separates compartment 2 from compartment 3, and a second set of baffles 8, 9, 10, separates compartment 3 from compartment 4. The maximum liquid capacity of the tank is determined by an overflow facility 11 at the end of the tank in which compartment 4 is situated. The overflow 11 is arranged so that overflowing liquid will collect in a reservoir 12 which may, if desired, be constituted by a further compartment in tank 1, separated from compartment 4 by a set of baffles 13, 14, whereby baffle 14 defines the overflow 11.

Baffles 6, 8, 10 and 11 extend across the tank from the bottom to a predetermined level below the top of the tank so that liquid can overflow over the baffle, whereas baffles 5, 7, 9 and 13 extend across the tank from above that predetermined level down to a predetermined height above the bottom of the tank so that liquid can pass under the baffles from one compartment to the next. In this manner liquid supplied to the full tank at 15 will proceed past the baffles as indicated by the arrows so that a predetermined residence time for the liquid in the compartments is assured, the possibility of some aqueous suspension or dispersion short-circuiting through the system being minimised.

In use, polymer particles are dispersed in water and the resulting dispersion is allowed to pour continuously at 15 into compartment 2 where an initial suspension forms and passes continuously under and over baffles 5, 6, 7, through compartment 3 where it is allowed to swell and thence similarly into compartment 4. Provision for applying shear to the suspension in compartments 3 and 4 is depicted in the form of turboagitators 16, 17. A stirrer (not shown) will be provided in compartment 2 to prevent material settling.

After the required residence time and shear application, the continuously flowing suspension reaches reservoir 12 from which it is taken by way of outlet valve 18 to the paper machine.

The residence time is preferably 10 to 120 minutes, more preferably 30 to 90 minutes.

It will be appreciated that further compartments could be provided in the sequence in the tank, by further subdivision or extension of the tank. Filler material for the preferred production of a preflocculated filler dispersion may be introduced, suitably distributed, possibly with added flocculant, for instance into the last compartment at 19, which may be into the third compartment or an additional fourth compartment. Alternatively such materials may be incorporated at 15.

The intensity and time of application of shear, e.g. by suitable stirring apparatus, should ideally be such that the dispersion becomes smooth and homogeneous, i.e. substantially free from visible globules when viewed for example by looking through a thin film of the dispersion on glass into a diffused light source. Excessive shear, indicated by thinning of the dispersion, is to be avoided.

The initial step of dispersing the polymeric binder, with or without further polymeric material or filler, as a suspension in water is performed in such a manner as to obtain the maximum degree of distribution of polymer particles into suspension, and in particular to avoid the formation in the water of particles composed of dry solid encapsulated by gelatinous partly solubilised polymer, such as starch based polymer.

This may be achieved in a number of ways, e.g. by means of an eductor, or a high shear disperser such as a Funken auto-jet mixer or Silverson flash mix. In a preferred method the polymeric binder or a mixture containing it may be entrained in the water by allowing a sufficiently thin stream of polymer particles to fall into a disperser having an array of inwardly directed water jets which form a controlled water curtain which then falls into the beginning of the treatment zone.

Referring to FIG. 2 an improved form of disperser is shown (much enlarged in relation to FIG. 1) for providing the feed at 15 in FIG. 1. In FIG. 2, an annular chamber 20 has a plurality of holes 21 in its inner wall 22 and is connected by pipe 23 to a water supply 24 so that jets 25 of water are produced through the holes 21 to form a controlled water curtain.

A supply pipe 26 for polymeric binder particles has an outlet 27 disposed above the annular chamber 20 and on the axis thereof, facing downwards, so that particulate material supplied through pipe 26 will fall into the water curtain. Below the outlet 27 is a distributor 28 in the form of a dome or cone, mounted symmetrically about the chamber axis above the water curtain level. Distributor 28 is preferably vertically adjustable by means represented at 29.

The polymeric binder or a mixture containing it, supplied as particulate material through pipe 26, becomes entrained in the water by falling in a thin stream into the array of inwardly directed jets 25 and a resulting dispersion of the particulate material in the water falls as a stream from the bottom of the disperser, suitable for introduction into the suspension compartment of the apparatus of FIG. 1.

The following Examples are given for the purpose of illustrating the invention.

EXAMPLE 1

A series of baffles divided a tank into 3×233 liter chambers and a final reservoir compartment. The first chamber had a slow paddle stirrer (90 watts; 90 r.p.m.) and the second and third chambers each had high speed P2 turboagitators (2 H.P.; 1440 r.p.m. (Moritz)).

Water was metered at 800 liter/hour into a disperser unit fitted with a spreader cone (see FIG. 2) as was 42 Kg/h of a starch based polymer ("Snowfloc"), and the resulting dispersion was passed through the chambers of the tank. The nominal residence time in each chamber was 18 minutes.

The first chamber contained a good particulate dispersion in water and swelling progressed. The controlled shear in the second and third chambers produced a solubilised polymer dispersion with a visually homogeneous appearance at approximately 5 percent weight polymer in water which was available at the reservoir and suitable for use in pre-flocculating a paper filler.

EXAMPLE 2

The procedure of Example 1 was followed but with a fourth 233 liter chamber, before the reservoir, fitted with a 2H turboagitator (Moritz) or a high-speed propellor stirrer. A 40 percent by weight chalk whiting slurry in water was metered into the fourth chamber at 1490 l/h. The product which passed to the reservoir was a pre-flocculated filler dispersion suitable for use in papermaking.

Examples of other materials useful in this context are cationic starches, starch with polyacrylamide and polyvinyl alcohol with polyacrylamide, with or without filler.

COMPARATIVE EXAMPLES

The procedure of Example 1 was followed but using three slow paddle stirrers (90 watt; 90 r.p.m.), one in each compartment, instead of the single slow stirrer and the turboagitators, and using a disperser unit having no spreader cone. Water was metered at 1000 liter/hour instead of 800 liter/hour. Under otherwise similar conditions to those of Example 1, the products obtained contained many so-called "fish-eyes", i.e. visible incompletely solubilised polymer.

In practice the rate of flow depends on the maximum output required to suit a papermaking machine and the apparatus is dimensioned accordingly. For example for rates up to 1000 liter/hour of 5 percent polymer solution a treatment zone provided by a tank having a capacity of 1000 liters is appropriate for a minimum residence time of 60 minutes. For very large paper machines up to 6000 liter/hour of 5 percent polymer solution may be required; smaller machines may use only 100 liter/hour. This low level could be supplied from the reservoir of a 1000 liter system. Typical capacities for each compartment or cell of the treatment zone are thus in the range 200 to 1500 liters.

In embodiments of the invention where filler is incorporated into the product, it will be necessary for sufficient shear to be applied at the point of introduction of the filler into the dispersion of polymeric material, in order to overcome the peak in viscosity caused by the initial flocculation of the filler. This may require a modification of the shear regime outline above.

Among the principal advantages of the invention are that the products are more consistent than with prior methods, and that the ratio of polymeric material to filler is readily adjustable to suit different paper qualities or specifications.

I claim:

1. In a method of supplying filler to a papermaking furnish which comprises the steps of forming preflocculated filler and then adding it to papermaking furnish, the improvement which comprises forming the preflocculated filler by continuously forming a suspension of polymeric binder in particulate form in water in which the concentration of the binder solids in the suspension is at least 0.5 percent by weight, said binder being a starch-based polymer; continuously passing the formed suspension through a zone wherein the suspended particulate polymeric binder is allowed to swell in the water and is subjected to shear; regulating the rate of continuous flow of the resulting dispersion through the zone, and the degree of shear applied, so that the residence time of the dispersed polymeric binder in the zone is at least sufficient for optimum swelling of said polymeric binder in the water and the resulting solution of polymeric binder in the water is visually homogeneous; continuously passing said solution to the papermaking furnish; and introducing filler into the water sufficiently in advance of contact of said solution with the papermaking furnish such that said filler is preflocculated prior to contact thereof with the papermaking furnish.

2. A method according to claim 1, wherein the application of shear is commenced after the onset of swelling of the binder, the said zone being subdivided and the shear being applied only downstream of the first subdivision.

3. A method according to claim 1, wherein the suspension traverses through the said zone a path the minimum length of which is determined by baffles subdividing the zone.

4. A method according to claim 1, wherein the suspension contains at least 1.0 percent polymeric binder solids based on the weight of the suspension.

5. A method according to claim 4, wherein the suspension contains at least 2.0 percent polymeric binder solids based on the weight of the suspension.

6. A method according to claim 1, wherein the polymeric binder is a cold-water-soluble starch product.

7. A method according to claim 1, wherein the polymeric binder is a flocculant for papermakers filler.

8. A method according to claim 1, wherein at least one added flocculant for paper filler is brought into solution with the polymeric binder.

9. A method according to claim 8, wherein the added flocculant is mixed with the initial supply of polymeric binder.

10. A method according to claim 8, wherein the added flocculant is mixed with the water and the polymeric binder in the formation of the suspension.

11. A method according to claim 8, wherein the added flocculant is mixed with the aqueous suspension of polymeric binder.

12. A method according to claim 11, wherein the added flocculant is mixed with binder material in aqueous suspension in the said zone.

13. A method according to claim 8, wherein the added flocculant is mixed with solubilised polymeric binder.

14. A method according to claim 8, wherein the added flocculant is a polyacrylamide.

15. A method according to claim 8, wherein the added flocculant is added in an amount of from 1 to 10 percent by weight based on the weight of polymeric binder.

16. A method according to claim 1 wherein the residence time of the suspension in the said zone is from 10 to 120 minutes.

17. A method according to claim 16, wherein the residence time is from 30 to 90 minutes.

18. A method according to claim 1, wherein the filler is mixed with the initial supply of polymeric binder.

19. A method according to claim 1, wherein the filler is mixed with the water and the polymeric binder in the formation of the suspension.

20. A method according to claim 1, wherein the filler is mixed with the suspension of polymeric binder in water.

21. A method according to claim 20, wherein the filler is mixed with binder material in aqueous suspension in the said zone.

22. A method according to claim 1, wherein the filler is mixed with solubilised polymeric binder.

23. A method according to claim 1, wherein the filler is calcium carbonate, clay, lithopone, barium sulphate, a titanium pigment, talc or satin white.

24. A method according to claim 23, wherein the filler is chalk whiting.

25. In a method of supplying filler to a papermaking furnish which comprises the steps of forming preflocculated filler and then adding it to papermaking furnish, the improvement which comprises forming the preflocculated filler by continuously forming a suspension of polymeric binder in particulate form in water in which the concentration of the binder solids in the suspension is at least 0.5 percent by weight, said binder being a starch-based polymer; continuously passing the suspension through a zone wherein the suspended particulate polymeric binder is allowed to swell in the water and is subjected to shear; regulating the rate of flow through said zone and the degree of shear applied to obtain a solution of polymeric binder in the water in which the dimensions of the finally dispersed polymeric material are of molecular order but have not undergone molecular scission; continuously passing said solution to the papermaking furnish; and introducing filler into the water sufficiently in advance of contact of said solution with the papermaking furnish as to assure that said filler is preflocculated in said solution prior to contact thereof with the papermaking furnish.

* * * * *